United States Patent
Singh et al.

(10) Patent No.: US 6,691,639 B2
(45) Date of Patent: Feb. 17, 2004

(54) METHODS AND SYSTEMS FOR PREDICTING A BODY CONDITION SCORE FOR PETS

(75) Inventors: Bhajmohan Ricky Singh, St. Louis, MO (US); Dorothy Laflamme, Millstadt, IL (US); Joan Ballam, St. Louis, MO (US); Monique Nielsen, St. Louis, MO (US); Diane Kalishman, St. Louis, MO (US)

(73) Assignee: Nestec, Ltd., Vevey (CH)

( * ) Notice: Subject to any disclaimer, the term of this patent is extended or adjusted under 35 U.S.C. 154(b) by 0 days.

(21) Appl. No.: 10/038,548

(22) Filed: Jan. 4, 2002

(65) Prior Publication Data

US 2003/0127057 A1 Jul. 10, 2003

(51) Int. Cl.[7] ............................................. A01K 39/00
(52) U.S. Cl. .................................................. 119/51.01
(58) Field of Search ............................. 119/51.01, 174, 119/421

(56) References Cited

U.S. PATENT DOCUMENTS

| | | |
|---|---|---|
| 4,464,122 A | 8/1984 | Fuller et al. |
| 4,986,757 A | 1/1991 | Mueller |
| 5,396,886 A | 3/1995 | Cuypers |
| 5,498,424 A | 3/1996 | Klein |
| 5,673,691 A | 10/1997 | Abrams et al. |
| 5,762,960 A | 6/1998 | Dodman |
| 5,839,901 A | 11/1998 | Karkanen |
| 5,954,640 A | 9/1999 | Szabo |
| 6,032,676 A | 3/2000 | Moore |

FOREIGN PATENT DOCUMENTS

WO    WO 90/05970    5/1990

OTHER PUBLICATIONS

Smith, William B; An Obesity Management System for Dogs and Cats; The Iams Company; 2000; entire document.*

Dunn, T. J; Normal values for dog and cat heatlth parameters; the Pet Center.*

Obesity therapy for dogs and cats; Body condition scoring chart☐☐.*

Purina body condition system; Placerville Veterinary Clinic 1995–2002.*

Dottie Laflamme DVM, PhD, Dipl. ACVN, "Development and Validation of a Body Condition Score System for Dogs," Canine Practice, Jul./Aug. 1997, vol. 22, No. 4.

Dottie Laflamme DVM, PhD, Dipl. ACVN, "Development and Validation of a Body Condition Score System for Cats: A Clinical Tool," Feline Practice, vol. 25, Nos. 5–6, 1997.

* cited by examiner

Primary Examiner—Robert P. Swiatek
Assistant Examiner—Bethany L Griles
(74) Attorney, Agent, or Firm—Sanjay Agrawal, Esq.; Armstrong Teasdale LLP

(57) ABSTRACT

A method is disclosed for predicting an accurate body condition score (BCS) for pets. The method includes selecting a BCS based upon a BCS chart, and applying the selected BCS and at least one other criterion including diet or activity level to a model to determine a predicted body condition score.

24 Claims, 5 Drawing Sheets

1 EMACIATED

2 VERY THIN

3 THIN

4 UNDERWEIGHT

5 IDEAL

6 OVERWEIGHT

7 HEAVY

8 OBESE

9 GROSSLY OBESE

FIG. 1

| | | |
|---|---|---|
| 1 EMACIATED |  | |
| 2 VERY THIN | | |
| 3 THIN |  | |
| 4 UNDERWEIGHT | | |
| 5 IDEAL |  | |
| 6 OVERWEIGHT | | |
| 7 HEAVY |  | |
| 8 OBESE | | |
| 9 GROSSLY OBESE |  | |

FIG. 2

| EXPERT BCS - SELF ASSESSED BCS | | | |
|---|---|---|---|
| Difference Between Expert BCS and Self Assessed BCS | Frequency | Percent | Cumulative Percent |
| -2 | 1 | 0.5 | 0.5 |
| -1 | 4 | 2.0 | 2.5 |
| 0 | 50 | 24.9 | 27.4 |
| 1 | 92 | 45.8 | 73.1 |
| 2 | 49 | 24.4 | 97.5 |
| 3 | 5 | 2.5 | 100.0 |
| TOTAL | 201 | 100.0 | |

FIG. 3

| Expert BCS | Model building data set | | | | | | Validation Data Set | | | | | |
|---|---|---|---|---|---|---|---|---|---|---|---|---|
| | Percent Predicted < Expert | Number Predicted < Expert | Percent Correct | Number Correct | Percent Predicted > Expert | Number Predicted > Expert | Percent Predicted < Expert | Number Predicted < Expert | Percent Correct | Number Correct | Percent Predicted > Expert | Number Predicted > Expert |
| 3,4 | 0 | 0 | 0 | 0 | 2 | 3 | 0 | 0 | 0 | 0 | 5 | 2 |
| 5 | 0 | 0 | 4 | 6 | 14 | 23 | 0 | 0 | 0 | 0 | 15 | 6 |
| 6 | <1 | 1 | 30 | 47 | 5 | 8 | 3 | 1 | 28 | 11 | 3 | 1 |
| 7 | 18 | 28 | 16 | 25 | 2 | 3 | 21 | 8 | 10 | 4 | 5 | 2 |
| 8 | 5 | 8 | 3 | 4 | 0 | 0 | 8 | 3 | 3 | 1 | 0 | 0 |
| 9 | 1 | 2 | <1 | 1 | 0 | 0 | 0 | 0 | 0 | 0 | 0 | 0 |
| Overall | 25 | 39 | 52 | 83 | 23 | 37 | 31 | 12 | 41 | 16 | 28 | 11 |

METHODS AND SYSTEMS FOR PREDICTING A BODY CONDITION SCORE FOR PETS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to the health of pets, and, more specifically to determinations of overweight and under weight conditions of pets.

Many pet owners purchase pet foods at retail locations in consideration of their pets' life stage, body condition, activity level etc, but without the benefit of examination or advice by a pet expert such as a veterinarian or an animal nutritionist. Many pet owners, while making decisions to purchase appropriate food, incorrectly assess the body condition of their pet, even when shown a visual chart. The problem is more acute for owners of overweight pets, since it has been determined that only 1 out of 7 owners of overweight pets correctly recognize their pet as overweight. Since these pet owners do not recognize overweight conditions of their pets, they are therefore unable to choose an appropriate calorie pet food for their pet, and the health of the pet may be jeopardized as a result. Further, the pet may not be correctly diagnosed as over-weight or under-weight until the assistance of an animal expert is requested.

The animal expert, for example, a veterinarian or animal nutritionist, is more likely to determine with a higher degree of objectivity and probability the body condition score (BCS) of pets. Such a determination is useful to non-expert pet owners and to pet food manufacturers to provide accurate food and care information to individual pets. Unfortunately, many pet owners do not have their pets examined by an animal expert, or consider themselves likely to make correct assessments when it comes to determining a body condition score for their pets.

BRIEF DESCRIPTION OF THE INVENTION

In one aspect, a method is provided for predicting a body condition score (BCS) for pets. The method comprises selecting a BCS based upon a BCS chart, answering a questionnaire regarding the pet, and applying the selected BCS and at least one answer from the questionnaire to a model to determine a predicted body condition score.

In another aspect, a method is provided for determining custom feeding and care instructions for a pet. The method comprises having an owner of the pet assign a body condition score (BCS), determining a predicted BCS using a model if the assigned BCS is within a specific range, determining an activity level for the pet, and making a recommendation regarding the pet according to at least one of the owner assigned BCS, the predicted BCS, and the determined activity level.

In still another aspect, a computer is provided which is programmed to predict an accurate body condition score (BCS) for pets. The computer is configured to apply a BCS and answers from a questionnaire, both input by a user, to a model to determine a predicted body condition score.

In yet another aspect, a computer is provided which determines custom feeding and care instructions for a pet. The computer is configured to accept input relating to an assigned body condition score (BCS), determine a predicted BCS using a model if the assigned BCS is within a specific range, accept input relating to an activity level for the pet, the activity level inputs being classified as one of low activity, high activity, and performance pet. The computer also is configured to make recommendations regarding the pet according to at least one of the BCS accepted as input, the predicted BCS, and the activity level accepted as input.

DETAILED DESCRIPTION OF THE INVENTION

Exemplary embodiments of methods and systems for predicting a body condition score for pets are described below in detail. The methods and systems facilitate, for example, a more accurate estimate by a pet owner of the true body condition score of a pet.

The methods and systems are not limited to the specific embodiments described herein. In addition, portions of each method and system can be practiced independent and separate from other portions described herein. Further, portions of each method and system can also be used in combination with portions of other methods and systems described herein and elsewhere.

Predictive models developed to assist a non-professional in determining an accurate body condition score (BCS) each include three components.

The Body Condition Score (BCS) Chart

Figure 1:
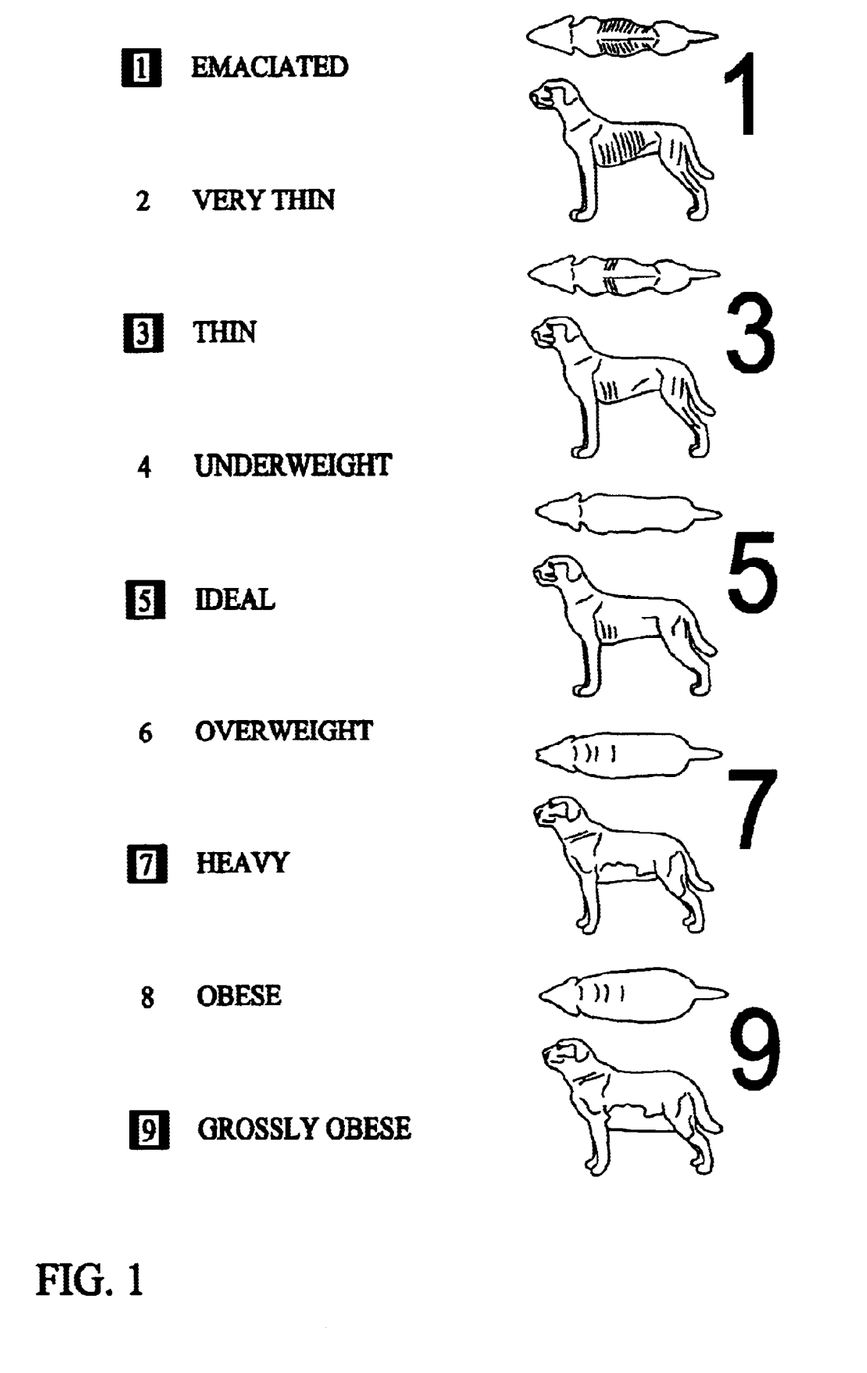
FIG. 1 is a known body condition score chart for dogs.

A BCS system, as described herein, defines both visually and textually various levels or conditions of dogs, cats and other pets. The definitions range from very emaciated to grossly obese. FIG. 1 is one embodiment of a BCS chart 10 for dogs. In the embodiment shown, the BCS of a dog is a scale ranking with a range from one to nine.

A score of one is emaciated. The dogs ribs, lumbar vertebrae, pelvic bones and all bony prominences are evident from a distance. There is no discernible body fat and an obvious loss of muscle mass. A score of two is very thin. the ribs, lumbar vertebrae, and pelvic bones are easily visible. The dog has no palpable fat. There is some evidence of other bony prominence and a minimal loss of muscle mass. A score of three is thin. The ribs are easily palpated and may be visible with no palpable fat. The tops of lumbar vertebrae also are visible. The pelvic bones are becoming prominent. There is an obvious waist and abdominal tuck.

A score of four is underweight. The ribs are easily palpable, with minimal fat covering. In addition the waist is easily noted, when viewed from above. An abdominal tuck is evident. A score of five is ideal. The ribs are palpable and without excess fat covering. The waist is observed behind the ribs when viewed from above, and the abdomen is tucked up when viewed from side. A score of six is overweight. The ribs are palpable with slight excess fat covering. The waist is discernible when viewed from above but is not prominent. An abdominal tuck is still apparent.

A score of seven is heavy. The ribs are palpable with difficulty, and have a heavy fat cover. There are noticeable fat deposits over the lumbar area and base of tail. The waist is absent or barely visible, and an abdominal tuck may be absent. A score of eight is obese. The ribs are not palpable and under a very heavy fat cover, or palpable only with significant pressure. There are heavy fat deposits over lumbar area and base of tail. The waist is absent and there is no abdominal tuck.ABdominal distention may be present and obvious. A score of nine is grossly obese. There are massive fat deposits over thorax, spine and base of tail. The waist and abdominal tuck are absent. There are fat deposits on the neck and limbs. Abdominal distention is obvious.

Figure 2:
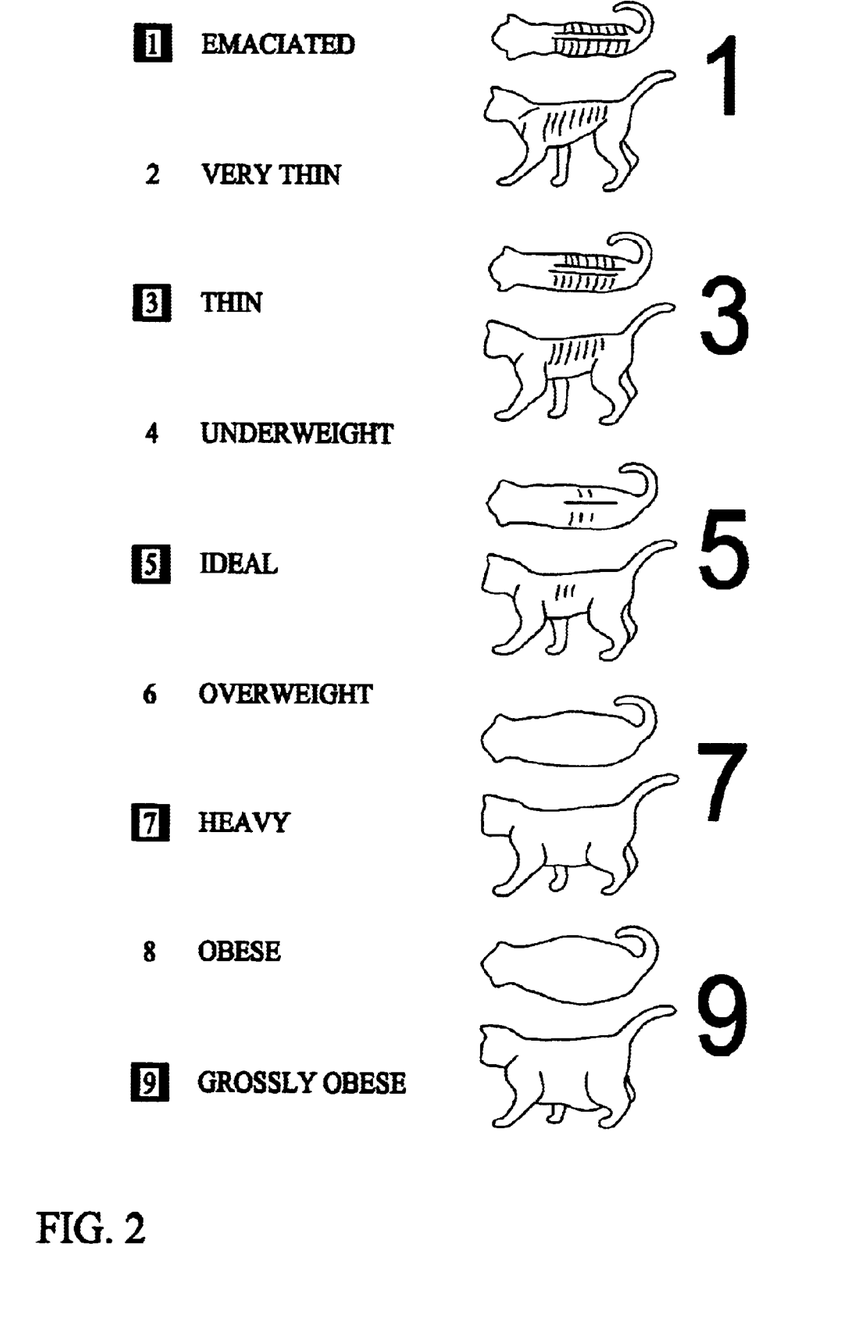
FIG. 2 is a known body condition score chart for cats.

FIG. 2 is one embodiment of a BCS chart 20 for cats. In the embodiment shown, the BCS of a cat is a scale ranking with a range from one to nine.

A score of one is emaciated. The ribs are visible on shorthaired cats. There is no palpable body fat and there is a severe abdominal tuck. The lumbar vertebrae and wing of ilia are easily palpated. A score of two is very thin and is a combination of a BCS of one described above and a BCS of three described below. A score of three is thin. The ribs are easily palpable with minimal fat covering. The lumbar vertebrae are obvious. There is an obvious waist behind the ribs and there is minimal abdominal fat.

A score of four is underweight and is a combination of a BCS of three described above and a BCS of five described below. A score of five is ideal. The cat is well proportioned, and the waist can be observed behind the ribs. The ribs are palpable with slight fat covering. An abdominal fat pad is minimal. A score of six is overweight and is a combination of a BCS of five described above and a BCS of seven described below.

A score of seven is heavy. The ribs are not easily palpated and have a moderate fat covering. The waist is poorly discernable with an obvious rounding of the abdomen. There is a moderate abdominal fat pad. A score of eight is obese and is a combination of a BCS of seven described above and a BCS of nine described below. A score of nine is grossly obese. The ribs are not palpable and under a heavy fat cover. There are heavy fat deposits over the lumbar area, the face and the limbs. The waist is absent and there is abdominal distention. There are extensive abdominal fat deposits.

The BCS allows trained experts to score pets, for example, dogs, cats and other pets, uniformly and consistently. Trained pet evaluators can reproducibly score the BCS of dogs and cats with a standard deviation of 0.4 (dogs) to 0.5 (cats) units. However, studies have indicated that the general pet owning population is unable to correctly assess BCS scores for their pets even when shown the visual chart. In particular, the studies showed that most pet owners underscore the BCS of their pets compared to experts when using the same chart. Underscoring of the BCS is a special issue with respect to identifying overweight pets, as most pet owners of overweight pets (6 out of 7) are unable to characterize their pets as overweight, even when using the BCS chart.

The Questionnaire

The second component of the exemplary BCS system embodiment is a self-administered questionnaire. In order to identify critical questions for use within the questionnaire, a test questionnaire was developed that includes approximately 30 questions about the pets of the pet owner, including, but not limited to, breed, age, weight, fitness, energy, exercise levels, and eating habits. The test questionnaire also included showing the BCS chart to the pet owners and asking the owners to rank their pet on the system. Another portion of the test questionnaire includes asking trained expert BCS scorers to rank the same pets on the BCS system.

Results of the test questionnaire are based on a test study which included in excess of 200 pet owners reporting over 200 pets. Pet owners that had multiple pets were allowed to report on only one pet. Participants were screened such that only the person in the household primarily responsible for caring for their pet answered the questionnaire. Participant pet owners also had to be non-expert pet owners. For example, the participating owners could not be employed by a company that manufactures or sells pet food, a veterinarian, or work at an animal hospital, clinic, the Humane Society, a kennel, or a pet shop or pet supply store. Experts were used to administer the test questionnaire to a sample of consumer participants. As stated above, experts also ranked the pets using BCS charts 10 and 20.

A statistical analysis of the results of the test questionnaire was completed and indicated differences between the BCS scores applied by the pet owners and the BCS scores applied by the pet care experts. The BCS chart defines ideal body condition as five, overweight condition as a score of six, and definitely overweight as seven and above. The average BCS score applied by the pet care experts was 6.3 with a normal distribution and just over two thirds of the sample was within plus or minus one BCS point of this mean (e.g. a BCS score between 5.3 and 7.3).

The average BCS score applied by the pet owners was 5.3. Therefore, the pet care experts considered 79% of the pets to be above the ideal of five while only 28% of the owners estimated their pet to be above a BCS of 5. The results of the test questionnaire indicate that pet owners are, on average, one BCS point lower than a pet care expert's evaluation, as reflected in the mean difference for the Experts BCS (6.3) and the pet owner self-assessed BCS (5.3). However, there was a substantial difference in the percent of the sample declared to be overweight (using six or greater on BCS scale) when comparing the pet care expert's perspective (79%) to the pet owner perspective (28%) using the same BCS scale and chart. Even if a higher BCS score of seven is used as definitely overweight, then also the difference between the expert (44%) and the owner (18%) BCS scores is substantial.

Figure 3:
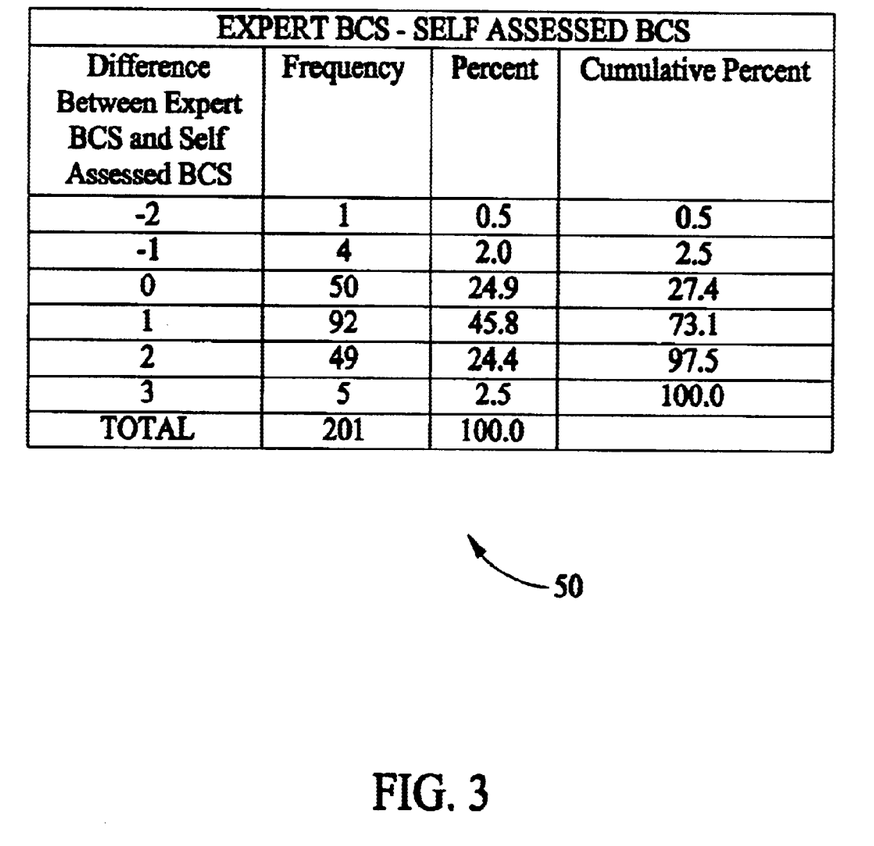
FIG. 3 is a chart illustrating differences in the body condition scores assigned by the pet owner and those assigned by a pet care expert.

FIG. 3 is a chart 50 in which the BCS assigned by the pet owner was subtracted from the BCS assigned by the pet care expert. Values greater than zero represent those instances where the BCS assigned by the expert was higher than the BCS assigned by the pet owner. Nearly 73% of the comparisons are greater than zero, with the majority being a one BCS point difference, indicating that pet owners are prone to underestimating the BCS of their pets. In only five cases (2.5% of the sample) the pet owner gave a BCS score higher than the pet care expert. In the remaining 25% of the comparisons, the expert and the pet owner agreed on the pet's BCS scores.

Statistical Models to Predict BCS Scores

The third component of the exemplary embodiment, of the BCS system is a predictive model generated from the questionnaire test results. In one embodiment, 80% of the data was used to build predictive models (model building data set) and 20% was withheld as a validation data set for the models. The initial analysis was limited to predicting two categories, not truly overweight (BCS 3–6) and truly overweight (BCS 7–9). A logistic regression analysis using stepwise selection techniques was used to determine the questions that were most useful in predicting the BCS selected by pet care experts. In addition, stepwise selection techniques were used in an ordinary least-squares regression analysis to predict the individual expert BCS, rather than groups of scores, from the questionnaire data.

Sensitivity and specificity were calculated for the models that classified the responses into two categories. Herein, sensitivity is defined as the probability of correctly classifying an overweight pet as overweight and specificity is the probability of correctly classifying a non-overweight pet as non-overweight. Sensitivity and specificity should be maintained in a balanced relationship.

In one embodiment, a logistic regression model predicts overweight conditions (BCS>=7) for pets. The model improves upon the pet owner self-assessment of overweight pets, which was at only 17% using BCS charts 10 and 20 (shown in FIGS. 1 and 2 respectively) alone.

Certain questions from the test questionnaire were correlated with the overweight conditions of the pets. In one embodiment, the variables (test questions) selected for use in logistic regression model for predicting an expert BCS, listed in order of importance, are: owner's assigned BCS, time period over which the pet eats their food, a description of the way the pets consumes their food, and how often the pet is fed table scraps. In alternative embodiments, the selected variables have alternative orders of importance. The responses to the questions are coded into five point scales before entering the analysis as shown below.

The first of the questions (Q1), in general does the pet eat its food in one sitting or does the pet nibble at it through the day has multiple choice answers as follows:

1—always eats the food in the bowl in one sitting,
2—usually eats all the food in the bowl in one sitting,
3—occasionally eats all the food in the bowl in one sitting,
4—seldom eats all the food in the bowl in one sitting, and
5—nibbles all day—never eats all the food in the bowl in one sitting.

The second of the questions (Q2), how would you describe the way your pet consumes its food, has multiple choice answers as follows:

1—inhales its food, the pet gobbles it down as fast as possible,
2—eats quickly, the pet eats it all in one sitting, but takes its time,
3—eats slowly, but finishes everything in its bowl within an hour of it being served,
4—nibbles at its food, but finishes it all during the day, and
5—nibbles at its food but rarely finishes all of it by the end of the day.

The third of the questions (Q3), how often do you give your pet treats or table scraps, has multiple choice answers as follows:

1—two or more times a day,
2—once a day,
3—several times a week,
4—several times a month, and
5—never.

The logistic regression model allows for the prediction of the probability that an observation falls into the overweight category given the information in the vector of explanatory variables. The linear logistic model has the following form:

$$\text{Log it}(p) = \log(p/(1-p)) = \alpha + \beta x$$

where:
p=the probability that a pet is classed as overweight given the information in x,
α=the intercept parameter,
β=the vector of slope parameters, and
x—the vector of explanatory variables (survey responses) for the pet.

The equation developed from the data in the model-building data set is:

$$\text{Log it}(p) = -10.286 + (1.77 \times \text{ownerBCS}) + (0.64 \times Q2) + (0.34 \times Q3) - (0.74 \times Q1)$$

Sensitivity of the above model was found to be 79% and specificity was found to be 76%. Testing of the logistic model in the validation data set resulted in a sensitivity of 78% and specificity of 71%, vastly improving upon the prediction of overweight pets compared to a BCS assigned by a pet owner.

In another embodiment, multiple variable models for predicting an expert BCS based on questionnaire responses have been developed. Each model has been built using the subset of data in the model building data set. Predicted responses are rounded to the closest whole integer and percentages of correctly and incorrectly classified responses are tabulated. The regression models are then applied to the validation data set and the percentages correctly classified are calculated.

In the multiple variable model embodiment, a four-variable model has been chosen for simplicity and because it provides adequate performance results. For the model building set, the four variable model correctly matched the BCS score to the BCS assigned by the pet care expert 52.2% of time (compared to only 25% of time without any model). For the remaining 48.8%, the prediction is evenly split between less than the expert's assigned BCS (24.5%) and more than the expert's assigned BCS (23.3%). Similar model performances have been obtained using the validation data set.

The variables selected by the stepwise procedure for predicting expert BCS, listed in order of importance, are: owner's assigned BCS, time period over which the pet eats their food, a description of how pets consume their food, and a description of the pet's weight (Q4), coded as follows:

1—extremely underweight,
2—somewhat underweight,
3—about average,
4—somewhat overweight, and
5—extremely overweight.

The regression equation developed from the data in the model-building data set had a residual standard error of 0.75 and adjusted $R^2$ of 0.44. The equation is given below:

$$\text{Expert BCS} = 2.44 + (0.531 \times \text{ownerBCS}) + (0.383 \times Q4) + (0.167 \times Q2) - (0.238 \times Q1)$$

Figure 4:
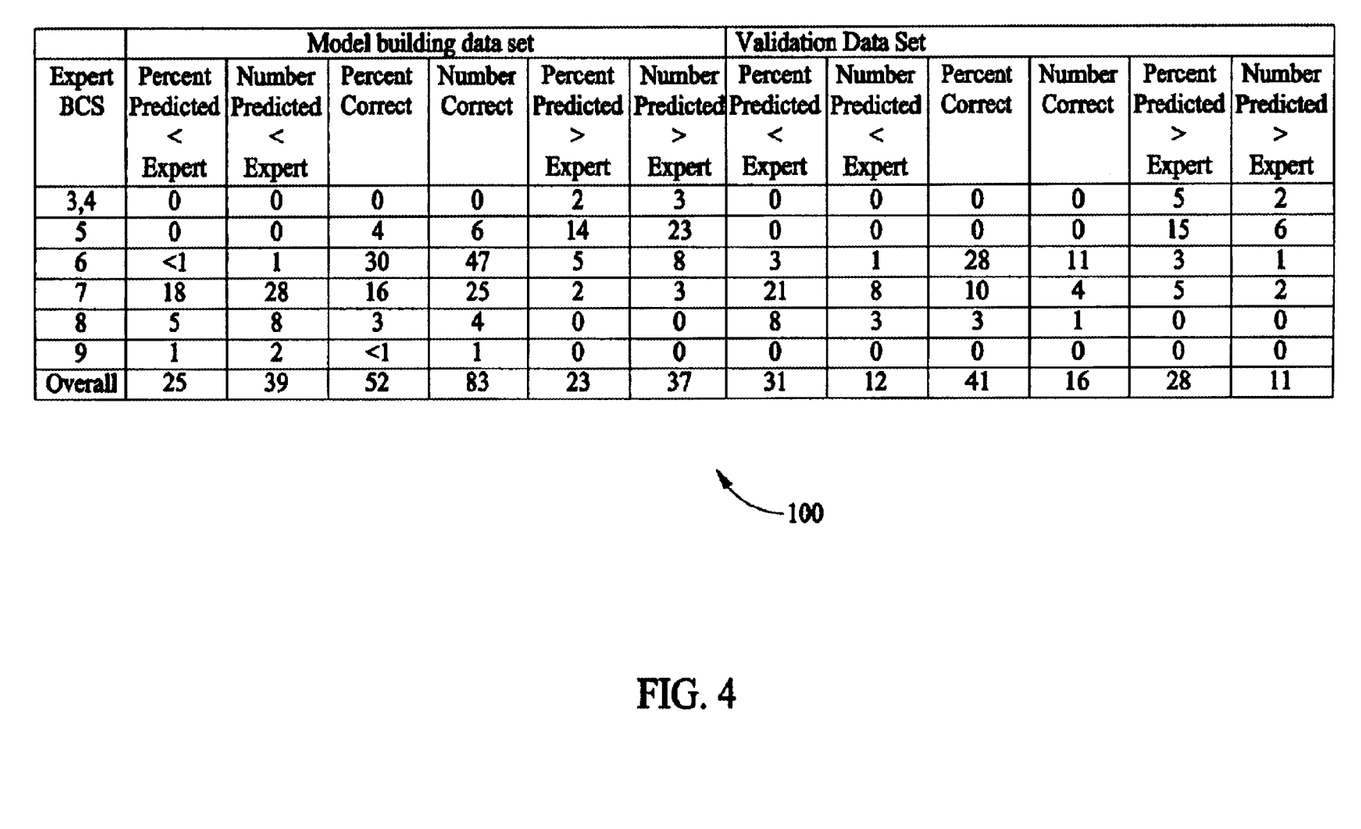
FIG. 4 is a table illustrating modeling performance for a four variable logic regression model.

FIG. 4 is a table 100 that illustrates modeling performance for a four variable ordinary least squares regression model. The percentage and numbers of pets correctly and incorrectly classified are tabulated by individual expert BCS levels between the range 3 to 9, for the four variable model. The number of pets that were incorrectly classified is presented as where the model predicted a BCS lower than the pet care expert, where the model predicted BCS and the pet care expert matched, and where the model predicted a higher BCS than the pet care expert. Similarly, a four variable logic regression model provides a prediction of overweight conditions versus non-overweight conditions in pets without predicting an individual BCS.

In a further alternative embodiment, custom feeding and care instructions are based on the above methods and require one additional question on activity level of the pet to be asked of the owner. The question is an owner assessment or description of the activity level of the pet. The possible answers are as follows:

1—My pet stays indoors most of the time; I take it for a walk or play with it outdoors for less than 1 hour each day.
2—My pet stays outdoors most of the time, so the pet gets its exercise outside.
3—I take my pet for a walk or play with it outdoors for 1-2 hours a day.
4—I take my pet jogging regularly or play with it outdoors more than 2 hours a day.
5—My pet goes hunting or is competitive in a sport such as fly ball, agility, or obedience.

Responses 1 and 2 are classified as low activity; responses 3 and 4 are classified as high activity and response 5 is classified as a performance pet.

In other embodiments, additional factors are considered for more elaborate custom feeding and care programs. Additional factors may include, but are not limited to, pet size, pet breed, a spayed or neutered status, age, amounts of treats consumed and dietary habits. The factors considered more specifically calculate caloric density of the food needed by the pet and a daily caloric intake need of the pet.

Figure 5:
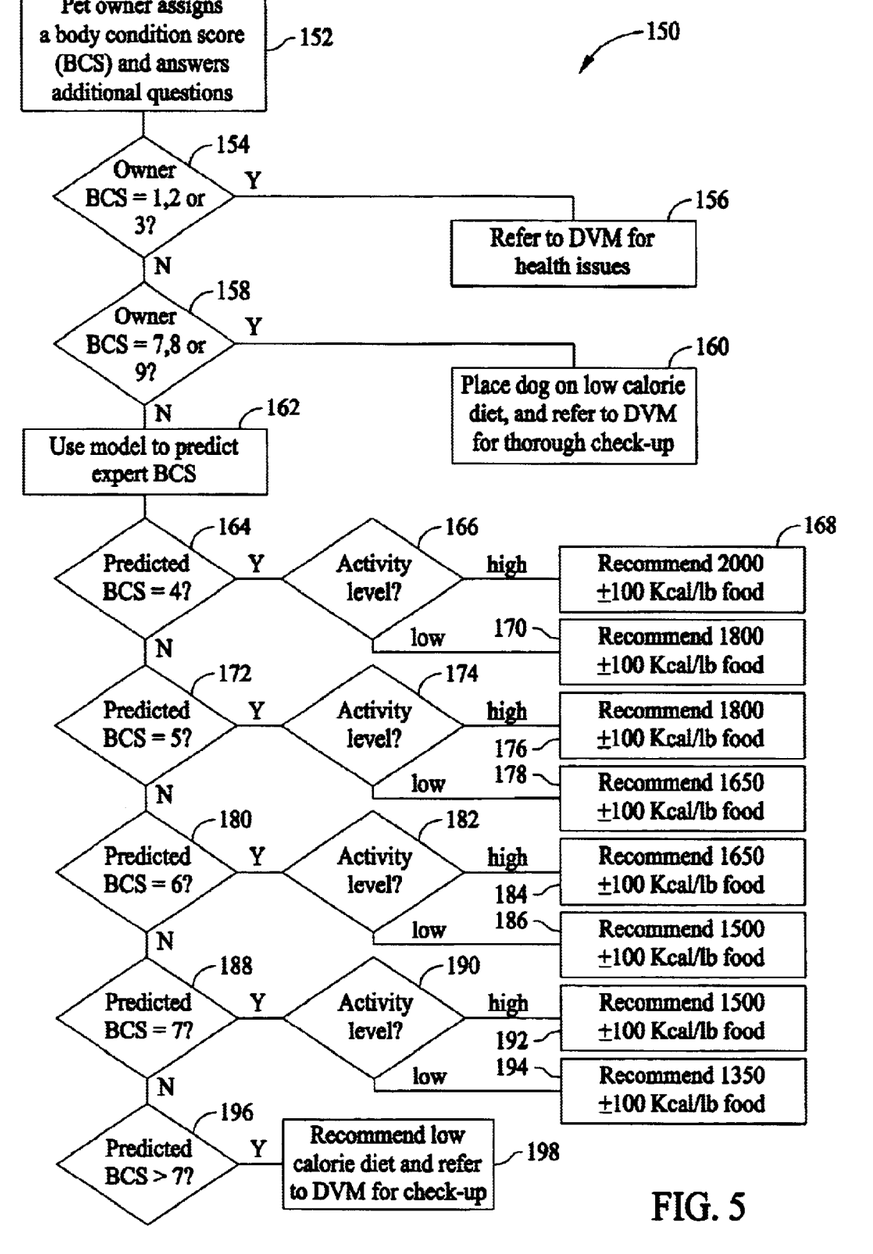
FIG. 5 is a flowchart illustrating a custom food and feeding algorithm using a predictive body condition score model and an assessment of the activity level for the pet.

FIG. 5 is a flowchart 150 which illustrates a custom food and feeding algorithm for pets using predictive BCS Models and an assessment of the activity level for the pet. A consumer is asked 152 to assess the BCS of a pet using chart 10 and to answer four additional questions (as described above). If the owner assigned BCS is equal 154 to 1, 2, or 3, the consumer is referred 156 to a Doctor of Veterinary Medicine (DVM) for health issues. If the owner assigned BCS is equal 158 to 7, 8, or 9, a low calorie diet is recommended 160 a low calorie diet and the owner is referred to the DVM for a thorough check-up.

The owner assigned BCS is then necessarily equal to 4, 5, or 6, and the model, described above is used to predict 162 a BCS. If the predicted BCS is equal 164 to 4, an activity level is checked 166. If the activity level is high, a 1900–2100 Kcal/lb food is recommended 168. In an exemplary embodiment, if the activity level is high, a 2000 Kcal/lb food is recommended. If the activity level is low, a 1750–1950 Kcal/lb food is recommended 170. In an exemplary embodiment, if the activity level is low, an 1850 Kcal/lb food is recommended.

If the predicted BCS is equal 172 to 5, an activity level is checked 174. If the activity level is high, a 1750–1950 Kcal/lb food is recommended 176. In an exemplary embodiment, if the activity level is high, an 1850 Kcal/lb food is recommended. If the activity level is low, a 1550–1750 Kcal/lb food is recommended 178. In an exemplary embodiment, if the activity level is low, a 1650 Kcal/lb food is recommended.

If the predicted BCS is equal 180 to 6, an activity level is checked 182. If the activity level is high, a 1550–1750 Kcal/lb food is recommended 184. In an exemplary embodiment, if the activity level is high, a 1650 Kcal/lb food is recommended. If the activity level is low, a 1400–1600 Kcal/lb food is recommended 186. In an exemplary embodiment, if the activity level is low, a 1500 Kcal/lb food is recommended.

If the predicted BCS is equal 188 to 7, an activity level is checked 190. If the activity level is high, a 1400–1600 Kcal/lb food is recommended 192. In an exemplary embodiment, if the activity level is high, a 1500 Kcal/lb food is recommended. If the activity level is low, a 1250–1450 Kcal/lb food is recommended 194. In an exemplary embodiment, if the activity level is low, a 1350 Kcal/lb food is recommended. If the predicted BCS is greater 196 than 7, a low-calorie diet is recommended 198 and the pet owner is referred to a DVM for a check-up.

The above described methods for predicting body condition score for pets, in addition to being used as an independent system, can also be incorporated into a more extensive pet care program. In one embodiment, the method for predicting body condition score for pets is one component of a custom care feeding program for pets.

The above described methods for predicting body conditions and feeding plans as a result of the determined conditions is implemented in a variety of platforms. In an exemplary embodiment, a web-site is developed and hosted on a computer enabling a pet owner to browse information and to select an appropriate food for their pet, for example, by using the internet to access the computer. A portion of the process, of selecting the appropriate food, includes providing a pet's body condition score or at least providing the information if their pet is underweight or thin (BCS less than 5), is ideal or fit (BCS of 5) or is overweight (BCS>=6).

The owner is asked if they are familiar with BSC scoring, whether they are an expert at BCS scoring, or whether they need help with BCS scoring. If the owner indicates that help is needed with the scoring they are shown the BCS chart to score and are asked to answer an additional 5 or 6 questions. Based on statistical modeling of their responses, as described above, the pet owner is given the predicted BCS which describes whether the pet is considered to be thin, ideal, or overweight. In one embodiment, the owner also is provided appropriate food and feeding instructions. In addition, to bolster the pet owners confidence in the prediction model, a description of the statistical accuracy of the prediction model is provided.

The modeling algorithms described above help consumers and pet food providers to more accurately match food choices to the needs of pets, without the need of an expert, by providing a working tool to help pet owners more reliably evaluate the needs of their pet. In addition, the modeling algorithms allow the consumer answers to be interpreted such that accurate results are obtained, which is advantageous to both consumers and pet food providers.

While the invention has been described in terms of various specific embodiments, those skilled in the art will recognize that the invention can be practiced with modification within the spirit and scope of the claims.

What is claimed is:

1. A method for determining custom feeding and care instructions for a pet, said method comprising:
having an owner of the pet assign a body condition score (BCS);
determining a predicted BCS using a model if the assigned BCS is within a specific range;
determining a current activity level for the pet;
implementing at least one of the steps of
   1. changing pet activity level
   2. changing pet diet
   3. recommending a visit to a veterinarian.

2. A method according to claim 1 wherein the activity level is determined using a five point scale, the five point scale comprising:

1—My pet stays indoors most of the time; I take him for a walk or play with it outdoors for less than 1 hour each day;

2—My pet stays outdoors most of the time, so my pet gets its exercise outside;

3—I take my pet for a walk or play with it outdoors for 1-2 hours a day;

4—I take my pet jogging regularly or play with it outdoors more than 2 hours a day; and 5—My pet goes hunting or is competitive in a sport such as fly ball, agility, or obedience, wherein responses 1 and 2 are classified as low activity; responses 3 and 4 are classified as high activity, and response 5 is classified as a performance pet.

3. A method according to claim 1 wherein a body condition score is assigned and predicted according to: one=emaciated, two=very thin, three=thin, four=underweight, five=ideal, six=overweight, seven=heavy, eight=obese, and nine=grossly obese.

4. A method according to claim 3 wherein for an assigned body condition score of one, two, or three, making a recommendation comprises referring the pet owner to a doctor of veterinary medicine.

5. A method according to claim 3 wherein for an assigned body condition score of seven, eight, or nine, making a recommendation comprises:

recommending a low-calorie diet; and referring the pet owner to a doctor of veterinary medicine for a thorough check-up.

6. A method according to claim 3 wherein the specific range for assigned BCS is four, five, and six.

7. A method according to claim 6 wherein for a predicted BCS of four, and an activity level of high, said method comprises recommending a 2000±100 Kcal/lb food.

8. A method according to claim 6 wherein for a predicted BCS of four, and an activity level of low, said method comprises recommending an 1850±100 Kcal/lb food.

9. A method according to claim 6 wherein for a predicted BCS of five, and an activity level of high, said method comprises recommending an 1850±100 Kcal/lb food.

10. A method according to claim 6 wherein for a predicted BCS of five, and an activity level of low, said method comprises recommending a 1650±100 Kcal/lb food.

11. A method according to claim 6 wherein for a predicted BCS of six, and an activity level of high, said method comprises recommending a 1650±100 Kcal/lb food.

12. A method according to claim 6 wherein for a predicted BCS of six, and an activity level of low, said method comprises recommending a 1500±100 Kcal/lb food.

13. A method according to claim 6 wherein for a predicted BCS of seven, and an activity level of high, said method comprises recommending a 1500±100 Kcal/lb food.

14. A method according to claim 6 wherein for a predicted BCS of seven, and an activity level of low, said method comprises recommending a 1350±100 Kcal/lb food.

15. A method according to claim 6 wherein for a predicted BCS of greater than seven, said method comprises:

recommending a low-calorie food; and referring the pet owner to a doctor of veterinary medicine for a thorough check-up.

16. A method according to claim 1 wherein the pet comprises one of a dog and a cat.

17. A method according to claim 1 wherein determining a predicted BCS comprises answering questions regarding at least one of breed, age, weight, fitness, energy, exercise levels, and eating habits of the pet.

18. A method according to claim 17 wherein answering questions comprises providing an owner's assigned BCS, a time period over which the pet eats its food (Q1), a description of the way the pet consumes its food (Q2), and how often the pet is fed table scraps (Q3).

19. A method according to claim 18, wherein providing a time period over which the pet eats its food comprises assigning a five point scale for the time period over which the pet eats its food according to:

1—always eats the food in the bowl in one sitting;

2—usually eats all the food in the bowl in one sitting;

3—occasionally eats all the food in the bowl in one sitting;

4—seldom eats all the food in the bowl in one sitting; and

5—nibbles all day—never eats all the food in the bowl in one sitting.

20. A method according to claim 18 wherein providing a description of the way the pet consumes its food comprises assigning a five point scale for describing the way a pet consumes its food according to:

1—inhales its food, the pet gobbles it down as fast as possible;

2—eats quickly, the pet eats it all in one sitting, but takes his time;

3—eats slowly, but finishes everything in its bowl within an hour of it being served;

4—nibbles at its food, but finishes it all during the day; and

5—nibbles at its food but rarely finishes all of it by the end of the day.

21. A method according to claim 18 wherein providing a description of how often the pet is fed table scraps comprises assigning a five point scale for describing often the pet is given pet treats or table scraps according to:

1—two or more times a day;

2—once a day;

3—several times a week;

4—several times a month; and

5—never.

22. A method according to claim 18 further comprising determining a probability that a pet is overweight according to Logit(p)=−10.286+(1.77×ownerBCS)+(0.64×Q2)+(0.34×Q3)−(0.74×Q1).

23. A method according to claim 17 wherein answering questions comprises providing a description of the weight of the pet (Q4) according to:

1—extremely underweight;

2—somewhat underweight;

3—about average;

4—somewhat overweight; and

5—extremely overweight.

24. A method according to claim 23 wherein determining a predicted BCS comprises determining a predicted BCS according to Expert BCS=2.44+(0.531×owner BCS)+(0.383×Q4)+(0.167×Q2)−(0.238×Q1).

\* \* \* \* \*